Jan. 25, 1927.
A. E. STRINGER
1,615,316
PIPE AND TESTING PLUG THEREFOR
Filed July 13, 1925
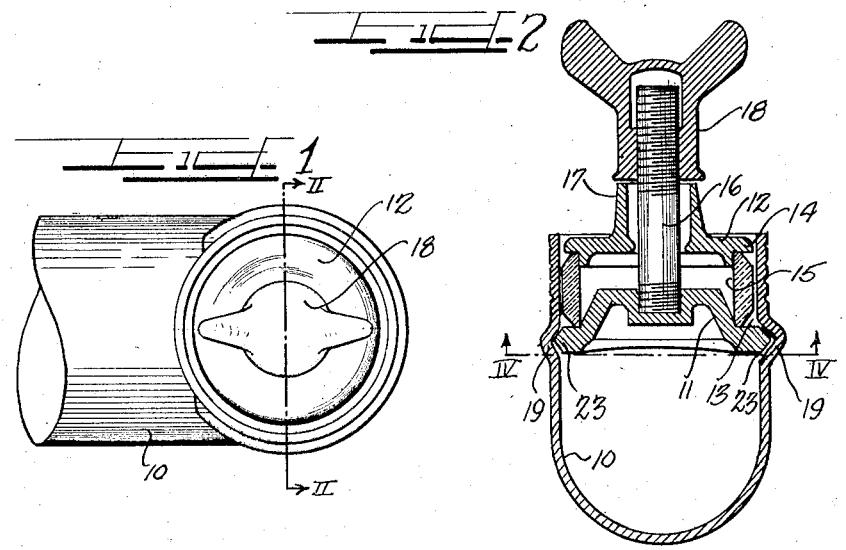
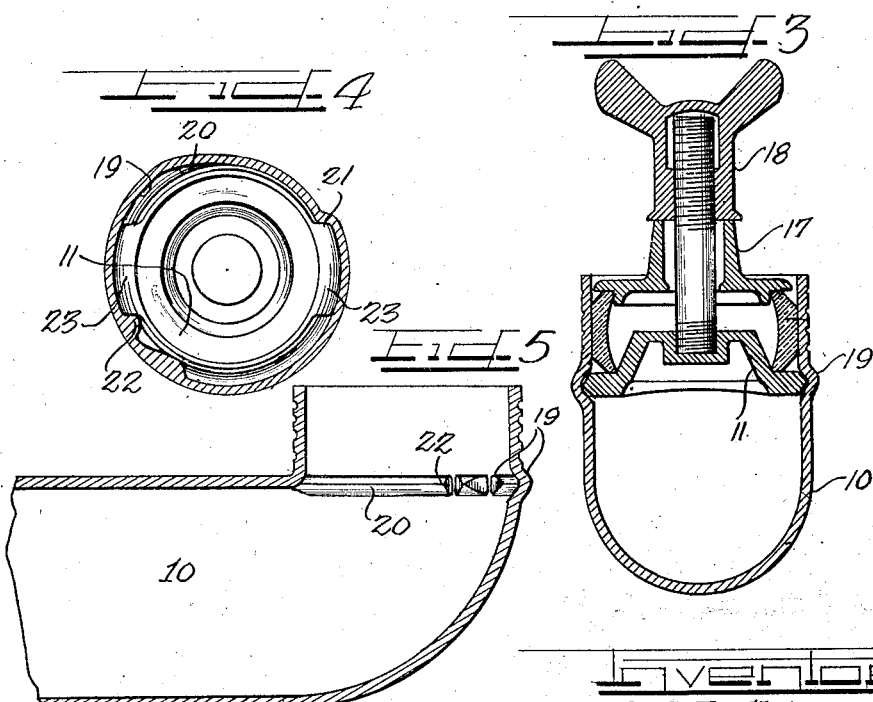
Inventor
Alfred E. Stringer.
By Charles W. Niell
Atty Patented Jan. 25, 1927.

1,615,316

UNITED STATES PATENT OFFICE.

ALFRED E. STRINGER, OF CHICAGO, ILLINOIS.

PIPE AND TESTING PLUG THEREFOR.

Application filed July 13, 1925. Serial No. 43,087.

This invention relates to test plugs for testing the water tightness of the soil or sewage piping of a building prior to connecting tubs, closet bowls and the like thereto.

It is an object of this invention to provide an expansion plug adapted to positively engage a groove in the pipe and to grip the inner surface of the mouth of the pipe to give a water tight seal while the system is tested under pressure. Heretofore caps or covers have been used for such purposes but have been difficult to make water tight on the uneven edge of a cast iron pipe and have also given trouble due to loosening because the water pressure acts in line with and opposes the clamping pressure and therefore tends to blow the cap off. The present invention contemplates an expanding seal together with a positive lock where the water pressure would have a further expansive effect which acts radially to improve the grip of the plug on the walls of the pipe.

It is also an object of this invention to provide an elbow connection grooved to receive lugs on the plug to provide positive retentive means for the plug. In order to retain the full strength of the pipe at the groove, the groove is formed by extending the material of the pipe outwardly without varying the wall thickness.

Other and further important objects of this invention will be apparent from the disclosures in the specification and the accompanying drawings.

The invention, in a preferred form, is illustrated in the drawings and hereinafter more fully described.

On the drawings:

Figure 1 is a plan view of a pipe and test plug embodying the features of the invention assembled in a pipe outlet.

Figure 2 is a vertical section on the line II—II of Figure 1 showing the plug in place in the pipe but not expanded.

Figure 3 is a section similar to that of Figure 2 showing the plug expanded into water-tight engagement with the inner walls of the pipe outlet.

Figure 4 is a section on the line IV—IV of Figure 2.

As shown on the drawings:

A pipe elbow 10 conforming in general outline to the type commonly used for connections to toilets and other soil pipe outlets has been chosen for illustrative purposes, the upstanding leg of which is intended to be temporarily plugged by the device of this invention during the testing procedure.

The closure proper comprises a pair of discs 11 and 12 having complementary annular surfaces 13 and 14, adapted to compress a packing ring 15 therebetween, the ring being beveled from the outer edges adjacent each disc so that the compressive pressure applied to the ring by the disc will serve to bulge the ring outwardly into firm contact with the walls of the pipe 10. The lower disc 11 carries an upstanding central stud 16 which projects through the boss 17 on the upper disc 12 and is engaged by the wing nut 18 to compress the ring 15. The structure so far described can be used with any form of straight or elbow fitting and the expansive grip of the ring 15 is sometimes not sufficient to maintain the plug in position against the water pressure as the pressure acts at right angles to the plug pressure against the walls.

However, such plugs occasionally blow out so that in order to provide a positive retention of the plug, especially in connection with elbow fittings, a groove 19 in the vertical arm of the elbow is provided adjacent the desired position of the disc 11, the outer walls of the pipe being extended outwardly around such groove so as to retain the normal wall thickness through the pipe. This groove opens into the horizontal branch of the elbow at 20 in Figure 4, the opposite end of the groove being provided with a shoulder 21 blocking off the groove adjacent the horizontal groove. A second shoulder 22 is positioned diametrically opposite the first shoulder and together these shoulders form stops for lugs 23 on the lower disc 11, the lugs engaging in the groove to retain the plug during assembly, to prevent its dropping down the pipe, and to prevent the possibility of a blow-out under the testing pressure.

To position the plug, the upper disc and the ring are removed and the lower disc tilted in the direction of the horizontal arm of the elbow so that it may be inserted into the open arm of the latter and lowered until one of the lugs 23 enters the horizontal arm of the elbow. The opposite lug on the disc may then be located in the groove and the entire disc rotated until the lugs engage the stops. These stops prevent further rotation of the disc while the wing nut is being screwed up. With the lower disc in place the packing ring, top disc and wing nut are assembled on the stud 16. The contact of the ring with the lower disc serves to seal the interior of the plug against water pressure and the bulging of the ring when compressed by the wing nut makes a fluid seal with the walls of the elbow. As the lugs are resting on the lower part of the groove, some play is provided which is available to allow the water pressure to lift the lower disc to increase the bulging effect of the ring, the locking engagement of the lugs with the wall preventing upward movement of the plug itself after the first slight movement.

The groove in the pipe wall cooperates with the lugs on the test plug to prevent the plug from dropping down into the pipe while being assembled, holds the plug from rotation while tightening the same, and also positively centers and retains the plug in the pipe.

I am aware that numerous details of construction may be varied through a wide range without departing from the principles of this invention, and I therefore do not purpose limiting the patent granted hereon, otherwise than necessitated by the prior art.

I claim as my invention:

1. An expansion plug for outlets of the type provided with grooves adjacent the ends thereof, said plug comprising a pair of opposed members, one of which has lugs to engage the grooves of the outlet and both of which are formed to provide upon their opposing faces peripheral gasket seats, a packing ring disposed edgewise between the members with its edges engaging the peripheral seats to prevent inward movement of the ring, and means to force said members toward one another whereby to compress the packing ring and expand the same into engagement with the inner surface of the outlet.

2. An expansion plug for elbow outlets of that type having internal grooves adjacent to the ends thereof, said plug comprising a pair of members, one of which has lugs to extend into the grooves of an outlet and is provided with a central boss having an axial threaded socket, the boss and socket opposing the other member, the second member having an annular rib projecting toward the first member and having a central boss, a stem threaded into the socket of the first member and rising through the boss of the second member, a clamping nut threaded on the upper portion of the stem and engaging the boss of the second member, and a packing ring disposed edgewise around and between said members with its edges engaging peripheral portions of the members, whereby upon movement of the members toward one another by manipulation of the clamping nut the said ring will be expanded against the inner surface of the outlet, the packing ring being prevented from inward collapse by the boss of the first member and the annular rib of the second member.

3. An expansion plug including a pair of clamping members, one of which has peripherally outstanding lugs, adjustable clamping means connecting said members, and a packing ring disposed edgewise around and between peripheral portions of said members and adapted to be expanded outwardly beyond the peripheries thereof, the said members being provided upon their opposing faces with means preventing inward collapse of the packing ring and said ring having outer beveled faces adjacent to its edges engaging the clamping members to facilitate outward bulging of the packing ring when the clamping members are shifted toward one another.

In testimony whereof I have hereunto subscribed my name.

ALFRED E. STRINGER.